Aug. 11, 1964  D. T. AYERS, JR  3,143,930
FLUID PRESSURE MOTOR MECHANISM
Filed April 30, 1962  3 Sheets-Sheet 2

INVENTOR
David T. Ayers, Jr.
BY John F. Phillips
ATTORNEY

Aug. 11, 1964     D. T. AYERS, JR     3,143,930
FLUID PRESSURE MOTOR MECHANISM

Filed April 30, 1962     3 Sheets-Sheet 3

INVENTOR
David T. Ayers, Jr.
BY John V. Phillips
ATTORNEY

United States Patent Office
3,143,930
Patented Aug. 11, 1964

3,143,930
FLUID PRESSURE MOTOR MECHANISM
David T. Ayers, Jr., Birmingham, Mich., assignor to Kelsey-Hayes Company, Romulus, Mich., a corporation of Delaware
Filed Apr. 30, 1962, Ser. No. 191,143
10 Claims. (Cl. 91—391)

This invention relates to a fluid pressure motor mechanism, and is an improvement over the structure shown in my copending application, Serial No. 181,409, filed Mar. 21, 1962.

In my copending application referred to I have disclosed and claimed a novel type of fluid pressure motor mechanism, particularly adapted for use in operating the brake systems of motor vehicles, wherein the fluid pressure motor is controlled by a valve mechanism operated by a brake pedal which partakes of very little movement in operating the valve mechanism since the brakes are fully power operated as distinguished from the booster types. Because very little pedal movement is required, the pedal lever may be arranged with the pedal pad relatively close to the floor boards of a motor vehicle for the operation of the brakes.

It is highly desirable in a mechanism of this character, used for operating vehicle brakes, to provide for the pedal actuation of the brakes in the event of a failure of the motor mechanism, and particularly a failure in the source of pressure. To this end, the copending application referred to provides means, operative upon a pressure failure, to lift the pedal to a substantially higher position from which it is movable to directly actuate the brakes in the same manner and with substantially the same pedal lever ratio as is true of conventionally operated brake systems. This is accomplished in the copending application by providing a spring which remains compressed so long as normal pressure is present in the source, the spring being released to move the pedal to a higher operative position upon a failure in pressure.

The structure of the copending application is such that there is a substantial gap in the normal pressure present in the source and the pressure at which the pedal-moving spring becomes operative to move the pedal to a higher normal position. For example, the spring may be held compressed when pressure in the source is 50 p.s.i. whereas a normal pressure in the source may be 150 p.s.i. There is a remote possibility that the source pressure may drop to a point only slightly above the pressure required for maintaining the spring compressed and such pressure may not be sufficient for a full power operation of the brakes. While there is only the remotest possibility that this condition will occur through inefficient operation of the compressor, leaks in the pressure lines, etc. it is desirable to take care of this condition since the pedal will not be moved for the full pedal operation of the brakes, thus possibly limiting the extent to which the brakes can be applied.

An important object of the present invention is to provide novel means which functions to provide for movement of the brake pedal to its second or higher normal position for the pedal operation of the brakes if pressure in the source drops to a point which is too low for the full application of the brakes.

A further object is to provide such a mechanism wherein, if pressure in the source drops below a predetermined point, the spring which raises the pedal to a higher position will be released to provide for the full pedal operation of the brakes.

A further object is to provide in combination with the mechanism of the copending application referred to a novel automatic valve device which functions upon a predetermined lowering of the pressure in the source, without a complete failure in such pressure, to open to the atmosphere a chamber which is normally under source pressure and which pressure is normally depended upon to hold inoperative the means for raising the pedal to its second position, so that the pedal-raising means becomes operative when such chamber is vented to the atmosphere.

Other objects and advantages of the invention will become apparent during the course of the following description.

In the drawings I have shown one embodiment of the invention. In this showing

FIGURE 4 is an enlarged axial sectional view through the automatic valve forming the principal subject matter of the present invention.

Figure 1:
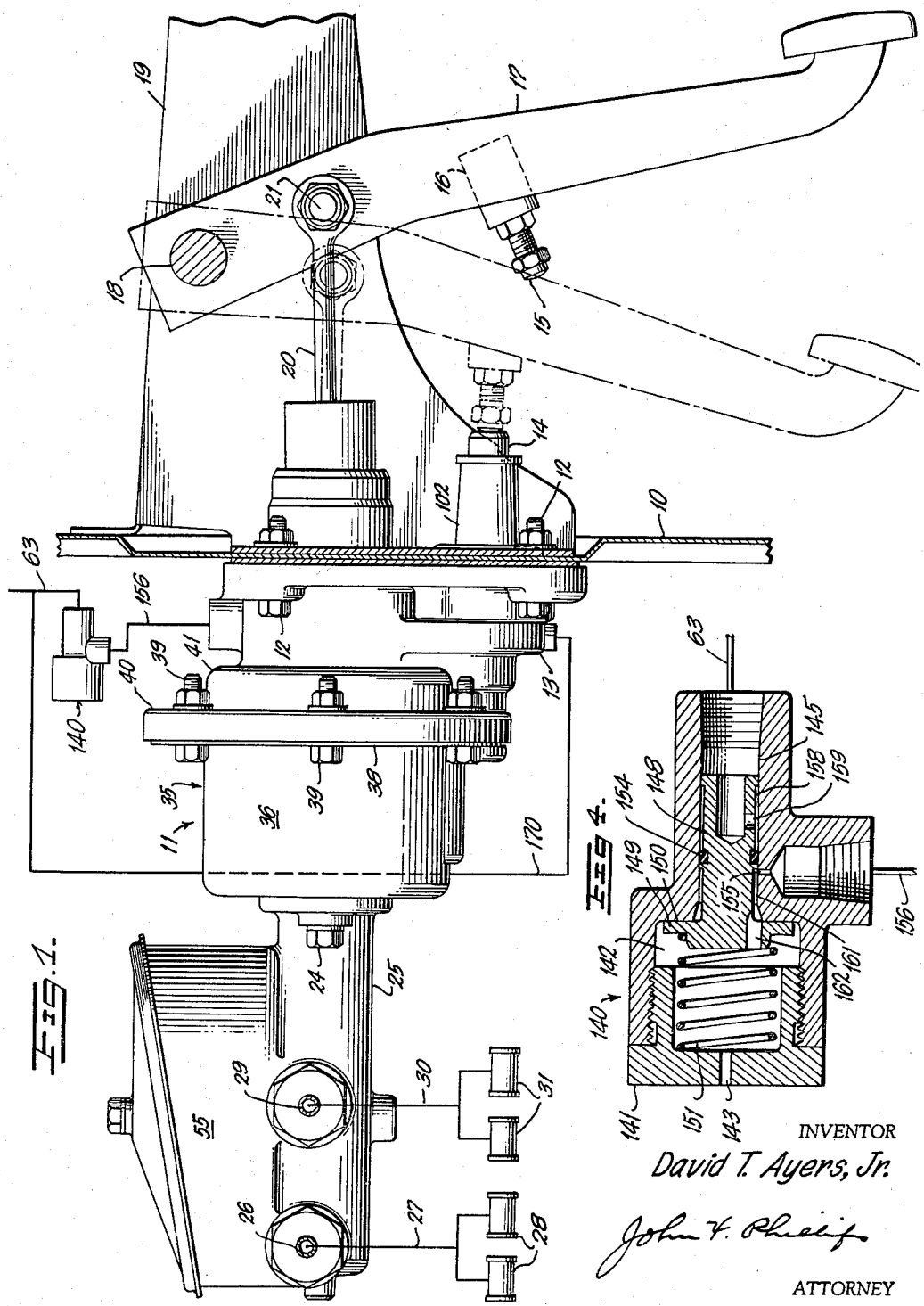
FIGURE 1 is a side elevation of the mechanism, the pedal being shown in solid lines in its higher position and in broken lines in its normal lower power operating position, the vehicle wheel cylinders and certain fluid lines being diagrammatically represented.

Referring to FIGURE 1, a conventional motor vehicle fire wall is indicated by the numeral 10 to which is attached the present mechanism indicated as a whole by the numeral 11, by bolts 12. The mechanism 11 includes a control valve to be described housed in a casing 13 and provided with an operating element 14 engageable by the head of an adjustable screw 15 carried by a boss 16 secured to a depending brake pedal 17. This pedal is provided at its lower end with the usual pad and is pivoted at 18 adjacent its upper end to a bracket 19 fixed to the fire wall 10. A rearwardly extending push rod 20 is pivoted at its rear end as at 21 to the pedal 17. As described below, the push rod 20 is utilized for effecting pedal operation of the brakes in the event of a failure in the pressure source to be described, the push rod normally moving idly during normal power operation of the brakes.

By suitable bolts 24 a master cylinder 25 is secured to the forward end of the mechanism 11. This master cylinder preferably is of the dual chamber type (not shown) the forward chamber of which is provided with an outlet 26 connected by lines 27 to the front wheel brake cylinders 28. An outlet 29 connects the rear chamber of the master cylinder by lines 30 to the rear brake cylinders 31.

Figure 2:
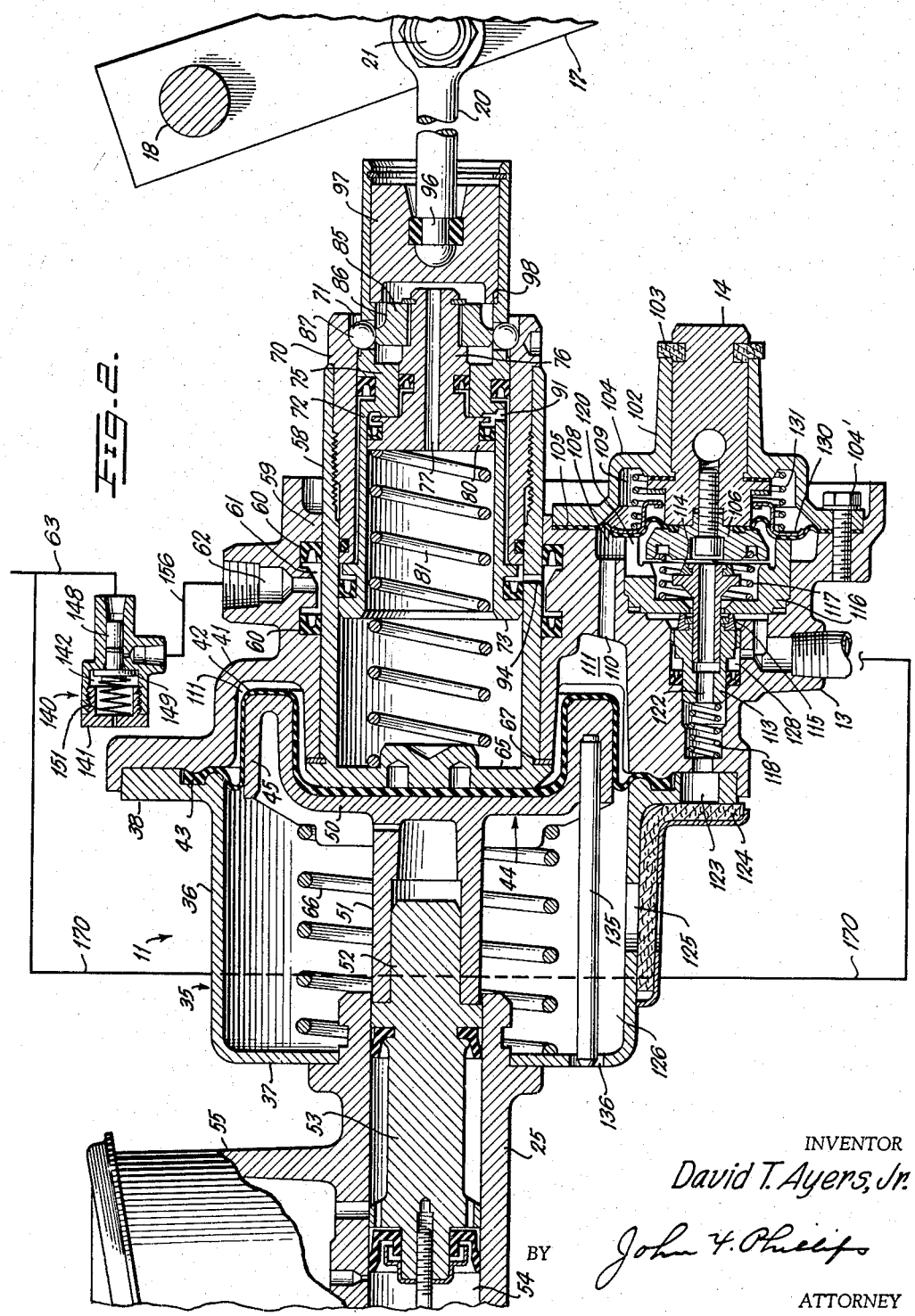
FIGURE 2 is an enlarged fragmentary axial sectional view through the motor and associated elements, the motor parts and the control valve mechanism therefor being shown in normal positions with the pedal in its higher normal position.
Figure 3:
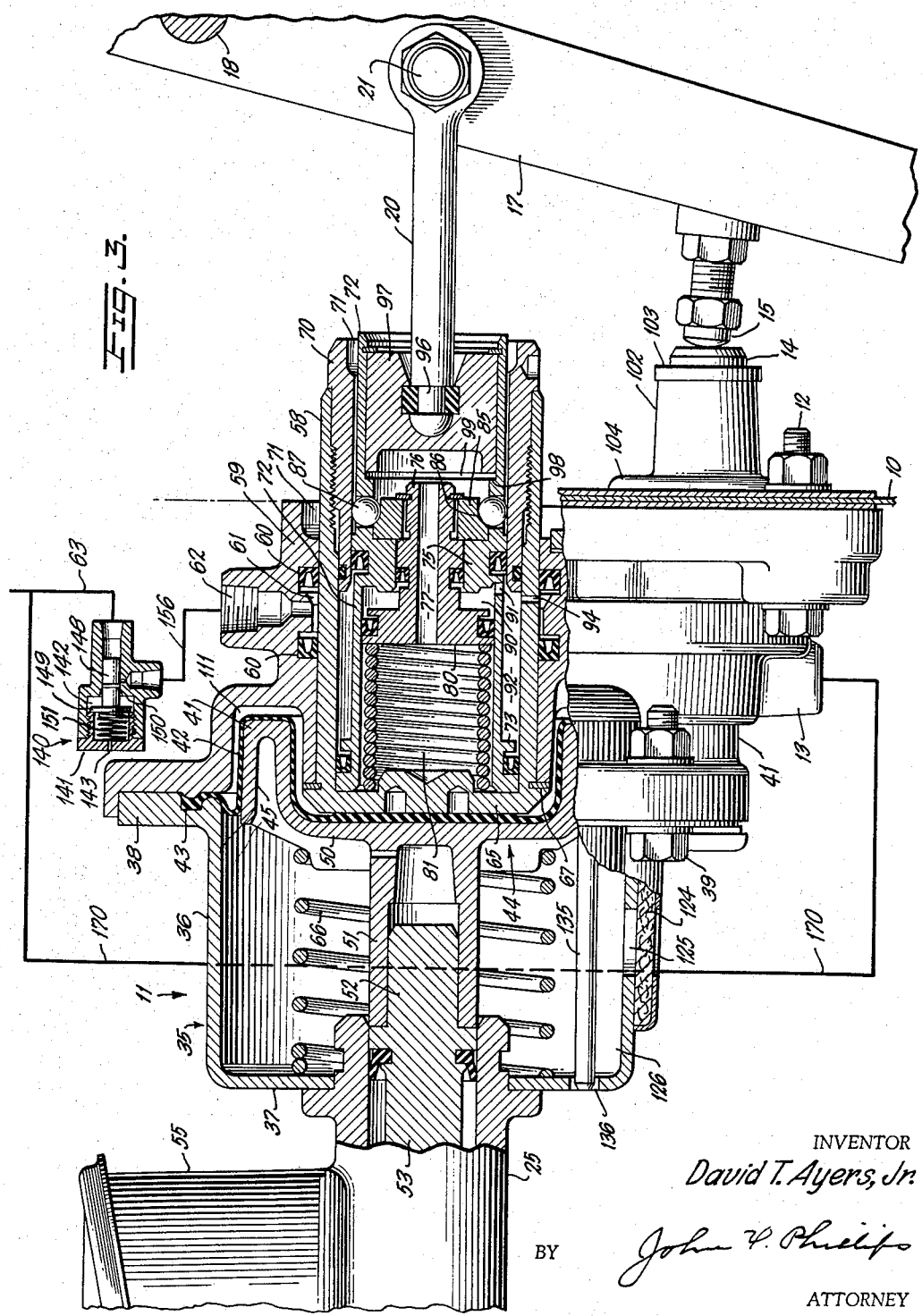
FIGURE 3 is a similar view, parts being shown in elevation, showing the motor and the elements of the present invention in normal positions for the power operation of the brakes.

As shown in FIGURES 2 and 3 the mechanism 11 comprises a motor indicated as a whole by the numeral 35 and including a cylindrical body 36 having a forward wall 37 to which the master cylinder 25 is secured. A rear outstanding flange 38 on the cylinder 36 is secured by bolts 39 (FIGURE 1) to an outstanding flange 40 formed on a motor head casting 41. A rolling diaphragm 42 has a peripheral bead 43 clamped between the flanges 38 and 40. The motor includes a pressure responsive unit 44 provided with an annular flange portion 45 over which the diaphragm 42 rolls when the motor is operated, as will become apparent.

The pressure responsive unit 44 includes a vertical wall 50 against which the central portion of the diaphragm 42 seats, and integral with the wall 50 is a forwardly projecting hub portion 51 in which is arranged a rear pilot stud 52 carried by the rear plunger 53 of the master cylinder 25. Such plunger displaces fluid from the rear pressure chamber 54 of the master cylinder and is connected by any suitable means to transmit force to the forward plunger (not shown) for displacing fluid to the front wheel cylinders. Hydraulic fluid is supplied to the master cylinder pressure chambers from a reservoir 55.

Rearwardly of the pressure responsive unit 44 is arranged a sleeve 58 slidable in bearing portions 59 of the head casting 41 and sealed with respect thereto as at 60 to provide a pressure chamber 61 normally communicating through a port 62, as described below, with a line 63 leading in the present case to a source of superatmospheric pressure.

The forward end of the sleeve 58 is provided with a head 65 against which abuts the central portion of the diaphragm 42. Such diaphragm and the pressure responsive unit are biased to their rear limit of movement, which is their normal position, by a return spring 66. A snap ring 67 limits rearward movement of the sleeve 58 relative to the head casting 41.

Threaded within the rear end of and fixed to the sleeve 58 is a coaxial sleeve 70 the rear end of which is provided with an internal annular recess 71 having a forwardly and inwardly curved forward extremity for a purpose to be described. Within the sleeve 70 is mounted for axial movement another coaxial sleeve 72 the forward end of which is annularly flanged as at 73 and sealed with respect to the inner surface of the sleeve 70. The flange 73 engages the forward end of the sleeve 70 to limit rearward movement of the sleeve 72 under power failure conditions, as described below.

The sleeve 72 has an internal flange 75 in which is slidable a stem 76, axially drilled as at 77 to connect to the atmosphere the space within the forward ends of the sleeves 70 and 72, as will become apparent. The stem 76 is provided with a forward flange 80 in sealed sliding engagement with the interior of the sleeve 72 and engageable with the flange 75 to limit rearward movement of the stem 76. A spring 81 biases the stem 76 to the rearward position shown in FIGURE 2 and is normally compressed when pressure is present in the source, as described below.

A cam ring 85 is carried by the rear end of the stem 76 and is provided with an external annular cam groove 86 the forward end of which curves forwardly and radially outwardly. Within this cam groove is normally arranged a plurality of balls 87 adapted to ride over the inner surface of the sleeve 70. These balls, when no pressure is present in the source, are urged outwardly into the grooves 71 as shown in FIGURE 2. The groove 86 may be annular, or there may be a series of circumferentially spaced grooves of the cross sectional shape shown with one ball 87 arranged in each groove.

As previously stated, the spring 81 is normally compressed as shown in FIGURE 3, and in the normal positions of the parts the flange 80 has its rear extremity spaced from the forward end of the internal flange 75 as shown in FIGURE 3. The space between the flanges 75 and 80 is indicated by the numeral 90 in FIGURE 3 and such space communicates through a port 91 with a chamber 92 formed between the sleeves 58 and 72, rearwardly of the flange 73. The chamber 92 communicates through a port 94 with the annular pressure chamber 61.

The pedal push rod 20 (FIGURES 2 and 3) is connected as at 96 with a head 97 slidable in the rear end of the sleeve 72. Such sleeve is provided with a shoulder 98 from which the forward end of the slidable member 97 is normally spaced (FIGURE 3) to provide loss motion 99 within the limits of which the rod 20 is movable for the operation of the valve mechanism to be described without transmitting movement to the sleeve 72 or any of the elements associated therewith.

The valve operating element 14 is slidable in an annular projection 102 formed on the valve housing 13 and is freely movable against the negligible resistance offered by a soft felt or other dust seal 103 (FIGURE 2). The portion of the valve housing 13 carrying the projection 102 is formed as a cap 104 fixed to the body of the valve housing as at 104', and a diaphragm 105 is secured between the body of the housing 13 and the cap 104. The inner periphery of the diaphragm 105 is secured between the inner extremity of the valve operating element 14 and a head 106 carried thereby. The diaphragm 105 divides the valve housing to form chambers 108 and 109 the former of which communicates through a passage 110 with the motor pressure chamber 111.

A two-part valve body 113 carries a valve 114, normally open and engageable with the head 106 upon movement thereof. The valve body further includes a normally closed pressure valve 115 engageable with the vertical wall of a block 116 arranged in the chamber 108. A spring 117 biases the head 106 to its normal off position, and a spring 118 biases the valve body to its normal position shown in FIGURE 2 with the valve 115 engaging the block 116.

Forward movement of the intermediate portion of the diaphragm 105 is limited by the rear portion of the block 116, this block being notched as at 120 to afford communication between the chamber 108 and an axial passage 122 formed through the valve body. This passage communicates as at 123 with an air cleaner 124, shaped as shown in FIGURE 2, extending across an opening 125 leading into the atmospheric chamber 126 of the motor 135.

To the left of the pressure valve 115 is formed a chamber 128 communicating with the pressure source as described below. Pressure is always present in the chamber 128 therefor ready to be admitted past the valve 115, when the latter is opened, and into the chamber 108 and thence into the motor chamber 111.

The diaphragm 105 is backed up by a ferrule 130, and a spring 131 beyond this ferrule biases the diaphragm 105 into engagement with the block 116.

Inasmuch as the present mechanism is wholly power operated with very slight pedal movement, it may be desirable to provide some means whereby progressive wearing of the brake bands may be determined. To this end, a gage rod 135 may be fixed as shown to the body of the pressure responsive unit 44 to project forwardly through an opening 136 in the head 37. The wearing of the brake bands may be determined by how far the rod 135 projects forwardly of the head 37 when the brakes are applied.

It will become apparent that the chamber 92 is always in communication with the pressure source when normal pressure is present therein, and pressure in the chambers 90 and 92 is depended upon to maintain the spring 81 compressed and inoperative as described below. Under conditions wherein pressure in the source drops through leakage or any other cause to a point where the spring 81 will not be released as described below, but wherein the source pressure is insufficient to energize the motor 35 to the extent necessary for full brake application, it is desirable to vent the chamber 92 to the atmosphere to render the spring 81 operative. Referring to FIGURES 2, 3 and 4, the numeral 140 designates a valve housing capped at one end as at 141 and provided therein with a chamber 142 vented to the atmosphere as at 143. The right-hand end of the valve body 140 is provided with a cylinder 145 the right-hand end of which is connected to the line 63 leading to the pressure source. A plunger 148 is slidable in the cylinder 145 and is provided at its left-hand end with a head 149 adapted to seat against a shoulder 150 forming the right-hand limit of the chamber 142. A spring 151 biases the head 149 to the operative position shown in FIGURE 4.

The plunger 148 is provided with an O-ring 154 to the right of the normal position of which (FIGURE 3) is formed in the housing 140 a port 155 communicating through a line 156 with the chamber 61 (FIGURES 2 and 3). To the right of the O-ring 154, the plunger 148 is reduced to form an annular passage 158 communicating as at 159 with the right-hand end of the cylinder 145 and thus with the line 63.

To the left of the O-ring 154, the plunger 148 is also reduced in diameter to form an annular passage 161 communicating with a port 162 in the head 149, this port communicating with the chamber 142 which is obviously always open to the atmosphere. As described below, the parts of the automatic valve, when pressure is present in the source, always occupy the positions shown in FIGURE 3, and when such pressure drops to a predetermined extent, the valve plunger 148 moves to the position shown in FIGURES 2 and 4.

The apparatus as described to this point is fully operative for performing the functions of the mechanism in my copending application, Serial No. 181,409, referred to above, and in fact is advantageous thereover, as further described below. It is pointed out that the automatic valve mechanism 140, while acting in combination with the other elements of the mechanism, is capable of use with other mechanisms operative for raising pedals for the foot operation of brakes upon a power failure, for example the mechanisms shown in the copending applications of Edward Govan Hill, Serial No. 157,971, filed Dec. 8, 1961, now Patent No. 3,063,427, and my copending application, Serial No. 162,151, filed Dec. 26, 1961. In the latter two copending applications, the mechanism for raising the pedal to a second higher normal position is associated with the brake pedal per se and is operative through a failure in the power source to provide for the pedal actuation of the brakes. The connection of the valve mechanism 140 with the rest of the mechanism therefor will vary according to the type of mechanism employed for raising the brake pedal. For example, in the pedal raising mechanisms of the last two copending applications referred to the line 156 will be connected to the air cylinder associated with the brake pedal, and the line 63 from the pressure source will be connected by a line 170 to the valve pressure chamber 128 (FIGURE 2). In the present instance, under such conditions, the passage connected between the chambers 61 and 128, as illustrated in my copending application, Serial No. 181,409, would be eliminated.

*Operation*

The valve plunger 148 in FIGURES 2 and 4 is shown in its operative position. Otherwise all of the various parts of the apparatus are shown in the positions which they normally occupy, including the valve plunger 148 in FIGURE 3. It will be noted that the right-hand end of the cylinder 145 (FIGURE 4) is connected to the main pressure line 63 leading to the source, the pressure of which usually will be about 150 p.s.i. Under such conditions, this source pressure, acting against the right-hand end of the plunger 148 will maintain the spring 151 compressed with the plunger head 149 in engagement with the inner end of the plug 141 as shown in FIGURE 3. Under such conditions, the O-ring 154 will be arranged to the left of the port 155 (FIGURE 3) and accordingly pressure fluid from the source will flow through line 63, ports 159 and 155 (FIGURE 4) and through line 156 to the port 62 (FIGURES 2 and 3) thus supplying pressure to the chamber 61. Thus pressure in the source will be maintained in the chambers 90 and 92 except under the emergency conditions described below in which the plunger 148 moves to the position shown in FIGURE 4.

Assuming that full or substantially full pressure is present in the source, such pressure will be present in the annular chamber or space 90 between the flanges 75 and 80 (FIGURE 3). This pressure exerts a forward force on the flange 80 and a rearward force on the flange 75 maintaining the latter seated against the cam ring 85 which cannot move rearwardly because of its associated snap ring which fixes it to the stem 76. Forward and rear pressures acting on the flanges 80 and 75 accordingly are substantially counterbalanced. Because of the port 91, source pressures will be balanced in the chambers 90 and 92. Since the sleeve 70 is fixed to the sleeve 58, pressure in the chamber 92 acts forwardly against the flange 73 to maintain it against the forward wall 65 of the sleeve 58 (FIGURE 3).

Assuming that the parts occupy the positions shown in FIGURE 3, pressure in the chamber 128 will be available through line 170 for operating the motor 35. The pressure valve 115 will be closed, while the atmospheric valve 114 will be open, and accordingly the motor chamber 111 will be vented to the atmosphere through passage 110, chamber 108 and through the valve body passage 122.

The motor 35 is operated by depressing the pedal 17 from the position shown in FIGURE 3. The head 15 (FIGURE 3), engaging the valve operating element 14, will move the head 106 to close the valve 114 and disconnect the motor chamber 111 from the atmosphere, and slight further movement of the brake pedal will move the valve body 113 to open the pressure valve 114 and thus admit pressure to the motor chamber 111. The motor piston 44 will then move to operate the master cylinder 25 to displace fluid into the wheel cylinders.

As previously stated, the mechanism is designed for the full power operation of the plunger 53, and accordingly very little movement of the valve operating element 14 is required. This movement takes place wholly within the limits of the lost motion space 99 (FIGURE 3). Pressure admitted to the chamber 108 past the valve 115 acts against the left-hand side of the head 106 to initially resist movement of the valve mechanism to provide the brake pedal with reaction. A second stage of reaction is provided when pressure in the chamber 108 increases sufficiently to act against the diaphragm 105, diaphragm pressure being transmitted through the inner periphery of the diaphragm to the valve operating element 14. The reaction will be proportional to the degree of energization of the motor, as will be understood. The valve mechanism and reaction means per se form no part of the present invention, except in the combination claimed.

The operator can readily control the maximum desired brake application by movement of the brake pedal, the pedal being slacked off slightly when the desired braking has been attained. Pressure in the chambers 90 and 92 will maintain the spring 81 compressed so that brake application will be solely the result of the energization of the motor 35.

The operation of the mechanism for the power application of the brakes as just described makes no provision for the pedal operation of the brakes in the event of a failure of power in the source. The apparatus, however, as disclosed in my copending application identified above, Serial No. 181,409, includes means for raising the pedal to a higher off-brake position and for transmitting direct pedal forces to the motor piston 44 if power in the source fails.

Assuming that a failure in the source pressure occurs or such pressure drops to a point which is below that required for the full power operation of the brakes, the spring 151 (FIGURE 4) will overcome the lowered pressure at the right-hand end of the plunger 148, thus moving such plunger to its operative position shown in FIGURES 2 and 4. The pipe 156 (FIGURE 2) will now open the chamber 61 to the atmosphere through port 155 (FIGURE 4), annular passage 161 and ports 162 and 143. Accordingly atmospheric pressure will be established in the chambers 90 and 92 (FIGURE 3) and the spring 81 will expand as soon as the pressure against the flange 80 is less than the force of the spring 81, and accordingly the flange 80 will be moved toward engagement with the flange 75. Such movement of the flange 80 will move in the same direction the cam ring 85 and the cam groove 86 will tend to force the balls 87 against the walls of the sleeve 70. Since the balls 87 cannot move radially outwardly, force will be directed against the right-hand sides of the ball guide holes in the sleeve 72 thus tending to move the sleeve 72 to the right. The drop in pressure in the chamber 92 relieves pressure against the flange 73, and when the flange 80 moves to the right in FIGURE 3, it moves the cam ring 85, balls 87 and sleeve 72 in the same direction.

Rearward movement of the sleeve 72, that is to the right in FIGURE 3, accomplishes two results. In the first place it causes the lost motion play 99 to be taken up, and thus movement will be transmitted through the member 97 to the push rod 20 to move the brake pedal 17 to the solid line position shown in FIGURE 1. When the flange 73 engages the sleeve 70, the continued force on the flange 80 will move it into engagement with the flange 75 (FIGURE 2). During this same movement the cam ring 85 will urge the balls 87 outwardly into the groove 71, all of the associated parts now occupying the positions shown in FIGURE 2. The high point of the cam ring 85 will now lie radially inwardly of the balls 87 to lock them into operative position shown in FIGURE 2.

If the operator now depresses the brake pedal 17 from the high position shown in solid lines in FIGURE 1 and shown in FIGURE 2, force will be applied from the member 97 through the shoulder 98, through the balls 87 to the sleeves 70 and 58. Thus force will be applied to the motor piston 44 through the central portion of the diaphragm 42. Accordingly the operator may fully apply the brakes by pedal pressure, the force being applied from the pivot point 21, and the lever ratio may be, for example, approximately 5.5:1 comparable to conventional leverage ratios in pedal operable brake systems. Thus, when the power fails, no more force is required for the operation of the brake pedal than is necessary in conventional systems. From the high pedal position shown in solid lines in FIGURE 1 it will be obvious that the head of the adjustable screw 15 is free to move throughout the range of pedal operation of the brakes without contacting the valve operating element 14.

Assuming that the pedal has been moved as described above to the high normal pedal position and pressure in the source is restored, all of the parts of the mechanism will return to their normal positions shown in FIGURE 3. When pressure is restored, it will move the flange 80 to compress the spring 81, such movement taking place because of the restored pressure in the chamber 90. Movement will be imparted to the cam ring 85 through its snap ring, and when the cam grooves 86 move with respect to the balls 87 to the relative position shown in FIGURE 3, the balls are free to move radially inwardly and such movement is accomplished by movement to the left of the sleeve 72. This sleeve is accordingly free to move forwardly after the balls 87 are released. Pressure in the chamber 92 against the flange 73 imparts a force to move the sleeve 72 forwardly, carrying with it the flange 80, cam ring 85 and balls 87, the spring 81 being compressed until the sleeve 72 contacts the head 65 and the flange 80 moves to the left of the flange 75, as shown in FIGURE 3. Thus the parts are automatically returned to their normal positions upon the restoration of pressure in the source.

The spring 81 is relatively heavy and may exert a force, for example, of fifty pounds when compressed and twenty-five pounds when expanded as shown in FIGURE 2. In my copending application, Serial No. 181,409, referred to above, a sudden power failure will suddenly release the spring 81 and a noisy operation results because of the force stored in the spring. The valve device 140 serves as a dash pot to somewhat retard the exhausting of air from the chambers 90 and 92 upon a sudden drop in pressure in the line 63 to that of the atmosphere. While the releasing action takes place very rapidly, it is not in the nature of an exploding force, thus providing a better and quieter operation when the spring 81 is released.

Moreover, whereas in the copending application just referred to the spring 81 would be released only upon a drop in pressure in the source to or substantially to atmospheric pressure, the valve mechanism 140 serves the additional function of rendering the spring 81 operative if pressure in the source is too low for a full power operation of the brakes. In other words, the function of the spring 81 for raising the brake pedal is not dependent upon a drop of pressure in the pressure line 63 to or a little above atmospheric pressure, since a drop of pressure in the source line 63 to a predetermined point renders the spring 151 (FIGURE 4) operative for connecting the pressure chambers 90 and 92 to the atmosphere. Thus a pedal operation is provided for under a different condition which can very readily result through the malfunctioning of the air compressor for the source or leakage in the output line of the compressor, or leakage from the air reservoir commonly employed in a system of this kind.

The line 170 is primarily usable with the systems of the copending application of Edward Govan Hill, Serial No. 157,971, and my copending application, Serial No. 162,151, both identified above, in which a pressure cylinder is carried by the brake pedal itself and serves normally to retain compressed a spring which is released to lift the brake pedal upon a failure of pressure in the source. In such system the line 170 would be used and the line 156 would be connected to the pedal-carried air cylinder. If the line 170 is used, it will be apparent that a complete failure of pressure in the source would open the valve pressure chamber 128 to the atmosphere, thus rendering the pressure valve 115 inoperative for supplying pressure to the motor 35 upon operation of the valve operating element 14. However, pressure supplied to the chamber 128 will be available for operating the motor unless and until pressure in the line 63 drops to the point at which the automatic valve 140 becomes operative for venting the chambers 90 and 92. At this point, any pressure supplied through line 170, insufficient for full power operation of the brakes will serve no purpose since the pedal 17 at that point will be raised to its upper solid line position in FIGURE 1.

Assuming that a power failure should occur after the operator has started to move the brake pedal from the solid line position shown in FIGURE 1, a condition which is highly unlikely, it will be apparent that the pedal cannot be moved to its high no-power position, assuming that the operator is exerting substantial pressure on the brake pedal. Under such conditions, the spring 81 will move the stem 76 and cam ring 85 to the right, forcing the balls 87 outwardly against the sleeve 70. The force of the spring 81 will take up the lost motion space 99. Therefore, with the pedal depressed or partially depressed, the operator will transmit force from the member 97 to the shoulder 98, through sleeve 72, balls 87, cam ring 85, member 76 and flange 80 to the spring 81. Thus by preventing further rearward movement of the rear end thereof, the spring 81 is caused to expend its force against the pressure responsive member 44 and thus apply the brakes. The lever ratio will be the same as for a pedal operation of the brakes, as described above, the difference lying in the fact that the force is transmitted to the master cylinder plunger through the spring 81.

From the foregoing it will be apparent that the present mechanism provides means for controlling the position of the pedal for either the power operation of the brakes with slight pedal movement, or for the pedal operation of the brakes, upon a power failure, with a substantial lever ratio to facilitate the brake operation. It also will be apparent that a complete failure in the pressure in the operating source is not necessary for the expansion of the spring 81, since the automatic valve 140 provides for manual operation of the brakes at any time the pressure from the source is below a point necessary for the full power operation of the brakes.

It is to be understood that the form of the invention shown and described is to be taken as a preferred example of the same and that various changes in the shape, size, and arrangement of the parts may be made as do not depart from the spirit of the invention or the scope of the appended claims.

I claim:

1. A fluid pressure motor mechanism comprising a pressure responsive unit having a pressure chamber at one side thereof, a valve mechanism connected between said pressure chamber and a source of pressure and operable for supplying fluid pressure to said pressure chamber to move said pressure responsive unit, a pedal having a first normal position engaging said valve mechanism and movable from such position to operate said valve mechanism, pedal control means including force generating means operable for moving said pedal to a second normal position disengaged from said valve mechanism and for mechanically connecting said pedal to said pressure responsive unit, said force generating means including movable means having a surface exposed to pressure in said source to normally maintain said force generating means inoperative, and means exposed to pressure in said source and operative when said pressure drops to a predetermined point for exposing said surface to atmospheric pressure.

2. A fluid pressure motor mechanism comprising a pressure responsive unit having a pressure chamber at one side thereof, a valve mechanism connected between said pressure chamber and a source of pressure and operable for supplying fluid pressure to said pressure chamber to move said pressure responsive unit, a pedal having a first normal position engaging said valve mechanism and movable from such position to operate said valve mechanism, pedal control means including force generating means operable for moving said pedal to a second normal position disengaged from said valve mechanism, means automatically operative when said pedal is moved to said second normal position for establishing mechanical connection between said pedal and said pressure responsive unit, said force generating means including a movable element provided with a surface exposed to pressure in said source and connected to said force generating means to maintain it inoperative when pressure in said source is above a predetermined pressure higher than atmospheric pressure, and means exposed to pressure in said source and operative when such pressure drops to said predetermined point for exposing said surface to atmospheric pressure.

3. A fluid pressure motor mechanism comprising a pressure responsive unit having a pressure chamber at one side thereof, a valve mechanism connected between said pressure chamber and a source of pressure and operable for supplying fluid pressure to said pressure chamber to move said pressure responsive unit, a pedal having a first normal position engaging said valve mechanism and movable from such position to operate said valve mechanism, pedal control means including force generating means operable for moving said pedal to a second normal position disengaged from said valve mechanism and for mechanically connecting said pedal to said pressure responsive unit, said force generating means including movable means having a surface exposed to pressure in said source to normally maintain said force generating means inoperative, and an automatic valve device connected to said source and having a movable member provided with a pressure area exposed to pressure in said source to be normally maintained in a given position in which source pressure is transmitted to said surface, and means biasing said movable member to a second position to which it is movable when pressure in said source drops to a predetermined point for exposing said surface to the atmosphere.

4. A fluid pressure motor mechanism comprising a pressure responsive unit having a pressure chamber at one side thereof, a valve mechanism connected between said pressure chamber and a source of pressure and operable for supplying fluid pressure to said pressure chamber to move said pressure responsive unit, a pedal having a first normal position engaging said valve mechanism and from which position it is movable to operate such mechanism, and pedal control means comprising a spring normally compressed and operative when released to move said pedal to a second normal position in which it is disengaged from said valve mechanism, means for establishing mechanical connection between said pressure responsive unit and said pedal when the latter is in said second normal position, pressure operable means subject to pressure in said source for normally maintaining said spring compressed, and valve means subject to pressure in said source and operative when such pressure drops to a predetermined point above atmospheric pressure for subjecting said pressure operable means to atmospheric pressure whereby said spring will be released.

5. A mechanism according to claim 4 provided with chamber means, said pressure operable means having at least one pressure surface exposed to pressure in said chamber means, said valve means normally connecting said chamber means to said source and being operative when pressure in said source drops to said predetermined point for connecting said chamber means to the atmosphere.

6. A fluid pressure motor mechanism comprising a pressure responsive unit having a pressure chamber at one side thereof, a valve mechanism connected between said pressure chamber and a source of pressure and operable for supplying fluid pressure to said pressure chamber to move said pressure responsive unit, a pedal having a normal position engaging said valve mechanism and movable from such position to operate said valve mechanism, and pedal control means arranged between said pedal and said pressure responsive unit and comprising a normally compressed spring, force transmitting means interposed between one end of said spring and said pedal and normally free of said pedal for movement of the latter to operate said valve mechanism, means subject to pressure in said source for normally maintaining said spring compressed, and valve means interposed between said last named means and said source for connecting said last named means to the atmosphere when pressure in said source drops to a predetermined point whereby said spring will expand to move said force transmitting means into engagement with said pedal and establish mechanical connection between said pedal and said pressure responsive unit.

7. A mechanism according to claim 6 wherein said valve means has one port connected to said source and another port connected to said last named means, a pressure responsive element having one end subject to pressure in said one port to be normally held by such pressure in a normal position connecting said ports, said means biasing said element for movement toward said one port to a second position in which said other port will be connected to the atmosphere whereby, when pressure in said source drops to said predetermined point said element will move to said second position.

8. A fluid pressure motor mechanism comprising a pressure responsive unit having a pressure chamber at one side thereof, a valve mechanism connected between said pressure chamber and a source of pressure and operable for supplying fluid pressure to said pressure chamber to move said pressure responsive unit, a pedal having two normal positions in one of which it engages said valve mechanism and from which it is movable to operate said valve mechanism, pedal control means arranged between said pedal and said pressure responsive unit and normally free of said pedal when the latter is in said one normal position for movement of said pedal to operate said valve mechanism, said pedal control means comprising normally relatively axially movable members constituting a force transmitting means, a source of stored energy interposed between said pressure responsive unit and said force transmitting means, said force transmitting means having a portion subject to pressure in said source for maintaining said source of stored energy inoperative, and valve means interposed between said portion of said force transmitting means and said source of pressure and operative upon a drop in such pressure below a predetermined point for exposing said portion of said force transmitting means to atmospheric pressure to release said source of stored energy to effect movement between said axially movable members to move said pedal to said second normal position and to establish mechanical connection between said force transmitting means and said pedal whereby said pedal is movable from said second normal position to transmit force to said pressure responsive unit through said force transmitting means.

9. A mechanism according to claim 8 wherein one of said axially movable members directly engages said pressure responsive unit, said source of stored energy being a normally compressed spring having one end engaging said one axially movable member and the other end engaging the other axially movable member, said other axially movable member, when said spring is released by operation of said valve means, engaging said pedal to move it to said second normal position for the direct operation of said pressure responsive unit by said pedal.

10. A mechanism according to claim 9 provided with means operable when said relatively movable members move a predetermined distance relative to each other and said pedal reaches said other normal position for positively locking said relatively movable members to each other for the direct positive transmission of force from said pedal through said relatively movable members to said pressure responsive unit.

References Cited in the file of this patent
UNITED STATES PATENTS

| | | |
|---|---|---|
| 2,706,020 | Freers et al. | Apr. 12, 1955 |
| 2,755,891 | Levell et al. | July 24, 1956 |
| 2,853,975 | Mognus | Sept. 30, 1958 |
| 2,910,147 | Fishtahler et al. | Oct. 27, 1959 |
| 2,923,278 | Katzberg | Feb. 2, 1960 |
| 2,959,011 | Randol | Nov. 8, 1960 |
| 2,980,066 | Stelzer et al. | Apr. 18, 1961 |